US010536950B2

(12) United States Patent
Filoche et al.

(10) Patent No.: US 10,536,950 B2
(45) Date of Patent: Jan. 14, 2020

(54) METHOD, DEVICE AND SYSTEM FOR DETECTING INTERFERENCES

(71) Applicant: THOMSON Licensing, Issy-les-Moulineaux (FR)

(72) Inventors: Thierry Filoche, Saint Aubin du Pavail (FR); Ghislaine Pondaven, Rennes (FR); Pascal Le Guyadec, Saint Cloud (FR); Christoph Neumann, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/894,850

(22) Filed: Feb. 12, 2018

(65) Prior Publication Data

US 2018/0234985 A1 Aug. 16, 2018

(30) Foreign Application Priority Data

Feb. 13, 2017 (EP) .................................... 17305158

(51) Int. Cl.
| | |
|---|---|
| *H04W 72/08* | (2009.01) |
| *H04W 72/04* | (2009.01) |
| *H04W 24/08* | (2009.01) |
| *H04W 4/80* | (2018.01) |
| *H04W 84/12* | (2009.01) |
| *H04W 88/08* | (2009.01) |

(52) U.S. Cl.
CPC ......... *H04W 72/082* (2013.01); *H04W 24/08* (2013.01); *H04W 72/0453* (2013.01); *H04W 4/80* (2018.02); *H04W 84/12* (2013.01); *H04W 88/08* (2013.01)

(58) Field of Classification Search
CPC .. H04W 52/0238; H04W 84/12; H04W 88/08
See application file for complete search history.

(56) References Cited

U.S. PATENT DOCUMENTS

| | | | |
|---|---|---|---|
| 6,286,104 B1 * | 9/2001 | Buhle ................... | H04L 63/105 707/999.009 |
| 7,583,933 B2 | 9/2009 | Hansen et al. | |
| 8,666,319 B2 | 3/2014 | Kloper et al. | |
| 9,521,556 B2 | 12/2016 | Jin et al. | |

(Continued)

OTHER PUBLICATIONS

Wong et al., "Peer-Assisted Channel Assignment for Home Wireless LANs", IEEE Global Telecommunications Conference (GLOBECOM 2006), San Francisco, California, USA, Nov. 27, 2006, pp. 1-6.

(Continued)

*Primary Examiner* — Robert M Morlan
(74) *Attorney, Agent, or Firm* — Brian J. Berini; Patricia A. Verlangieri (57) ABSTRACT

A method for detecting interferences in wireless networks is disclosed. A salient idea is to use a first access point for detecting an interference disturbing a wireless device associated with a second access point, wherein the device at the origin of the interference is in the range of the first access point, but not in the range of the second access point. Leveraging on the difference of coverage between different wireless networking technologies, the first access point is capable of detecting both a data traffic of a second access point and a short-range interfering device in a same frequency channel.

20 Claims, 4 Drawing Sheets

(56) References Cited

U.S. PATENT DOCUMENTS

2006/0013179 A1  1/2006  Yamane
2013/0336140 A1  12/2013 Ma
2014/0044095 A1  2/2014  Li et al.
2015/0181609 A1  6/2015  Nusairat et al.
2016/0262163 A1  9/2016  Gonzalez et al.

OTHER PUBLICATIONS

Anonymous, "Further analysis on hidden node detection based no RSSI report", 3rd Generation Partnership Project, 3GPP TSG-RAN WG2 #90, LG Electronics Inc., Fukuoka, Japan, May 25, 2015, pp. 1-5.

Anonymous, "Avoiding RF Interference Between WiFi and Zigbee", MICAz-Based ZigBee and WiFi Coexistence, Crossbow, Https://www.mobiusconsulting.com/papers/ZigBeeandWiFiInterference, Jan. 2017, pp. 1-5.

* cited by examiner

METHOD, DEVICE AND SYSTEM FOR DETECTING INTERFERENCES

1. REFERENCE TO RELATED EUROPEAN APPLICATION

This application claims priority from European Patent Application No. 17305158.2, entitled "Method, Device and System for Detecting Interferences", filed on Feb. 13, 2017, the contents of which are hereby incorporated by reference in its entirety.

2. TECHNICAL FIELD

The technical field of the disclosed method, device and system is related to wireless networks, wireless access points and interference detection in radio frequency channels.

3. BACKGROUND ART

Wireless networks using unlicensed bands are very popular and used at many places. Wi-Fi represents a widely adopted technology all over the world operating in the unlicensed 2.4 GHZ and/or 5 GHz bands. As Wi-Fi gets widely adopted, the unlicensed bands get crowded and access points have to mitigate interferences by appropriate channel allocation techniques. Moreover as unlicensed bands are open by nature to different kinds of network protocols, devices operating in those bands must deal with various types of interferences. The 2.4 GHz unlicensed band is for example used by microwave ovens, Bluetooth devices, cordless phones, baby monitors and IEEE 802.15.4 devices, also known as ZigBee devices. Some methods are known for mitigating interference problems such as dynamic channel allocation methods being performed by access points. Dynamic channel allocation methods generally comprise an access point scanning the frequency band, measuring a received signal strength on various frequency channels and looking for a frequency channel with a reasonably low level of activity. Because an access point is not located at the same place as its associated devices, there may be situations where an associated device is locally disturbed by another wireless interfering device that is not in the range of the access point. In such a situation, even if the access point detects a degradation of the transmission performance with an associated device, the access point has no technical element to diagnose the problem and to fix it. As the interfering device is not in the range of the access point, there is no way for the access point to determine the origin of the problem. Such performance degradations are frequent reasons of a perceived malfunction of a Wi-Fi network by a user that may reject the fault to her Wi-Fi gateway.

Moreover, with the rapid growth of smart home solutions based on IEEE 802.15.4, also known as ZigBee, having a smaller coverage than Wi-Fi and sixteen channels overlapping Wi-Fi channels, such situations occur more and more frequently. A solution is needed for enabling an access point to detect interferences occurring at a remote place and disturbing some of its wireless associated devices.

4. SUMMARY

A salient idea is to use a first access point for detecting an interference disturbing a wireless device associated with a second access point, wherein the device at the origin of the interference is in the range of the first access point, but not in the range of the second access point. Leveraging on the difference of coverage between different wireless networking technologies, the first access point is capable of detecting both a data traffic of a second access point and a short range interfering device in a same frequency channel. More precisely, by measuring a level of strength of a signal received in the frequency channel at a period of time where no data traffic of the second access point is detected, the first access point is capable of detecting an interference according to the measured signal. The detected interference corresponds to another device using the frequency channel of the second access point, without communicating with the second access point. As the interference detected by the first access point may not be detectable by the second access point (because not being in the range of the second access point although disturbing some of its associated devices), the first access point advantageously sends an information item indicating the interference has been detected. Sending such indication is advantageous as it allows the second access point to detect an interfering device, even if not being in its range.

To that end a method in a first access point for detecting an interference is disclosed. The method comprises:
 detecting a data traffic of a second access point on a frequency channel;
 obtaining a level of strength of a signal received in the frequency channel at a period wherein the data traffic is not detected;
 sending an information item indicating the interference has been detected in the frequency channel according to the obtained level.

According to a particularly advantageous variant, sending the information item comprises transmitting the information item in the frequency channel.

According to another particularly advantageous variant, sending the information item comprises broadcasting the information.

According to another particularly advantageous variant, sending the information item comprises a unicast transmission of the information item to the second access point.

According to another particularly advantageous variant, the first access point and the second access point are Wi-Fi access points.

According to another particularly advantageous variant, obtaining the level of strength of the signal comprises performing a clear channel assessment of the frequency channel.

According to another particularly advantageous variant, the first access point further comprises another wireless interface according to a protocol of type ZigBee or Bluetooth.

According to another particularly advantageous variant, the information item further comprises an indication of the type of protocol having created the interference.

According to another particularly advantageous variant, the information item further comprises a value quantifying the detected interference.

In a second aspect a method in a second access point for detecting an interference is also disclosed. The method comprises:
 sending and receiving data in a frequency channel,
 receiving from a first access point an information item indicating that the interference has been detected according to a level of strength of a signal obtained by the first access point in the frequency channel at a period wherein no data is sent or received by the second access point.

According to another particularly advantageous variant, the method further comprises switching the second access point to a second frequency channel for measuring another level of strength of another signal received on the second frequency channel.

In a third aspect, a first access point device configured for detecting an interference is also disclosed. It comprises:
Means for detecting a data traffic of a second access point on a frequency channel;
Means for obtaining a level of strength of a signal received in the frequency channel at a period wherein the data traffic is not detected;
Means for sending an information item indicating the interference has been detected in the frequency channel according to the obtained level.

In a fourth aspect, a first access point device configured for detecting an interference is also disclosed. It comprises a processor configured to:
detect a data traffic of a second access point on a frequency channel;
obtain a level of strength of a signal received in the frequency channel at a period wherein the data traffic is not detected;
send an information item indicating the interference has been detected in the frequency channel according to the obtained level.

In a fifth aspect, a second access point device configured for detecting an interference is also disclosed. It comprises:
Means for sending and receiving data in a frequency channel,
Means for receiving from a first access point an information item indicating that the interference has been detected according to a level of strength of a signal obtained by the first access point in the frequency channel at a period wherein no data is sent or received by the second access point.

In a sixth aspect, a second access point device configured for detecting an interference is also disclosed. It comprises a processor configured to:
send and receive data in a frequency channel,
receive from a first access point an information item indicating that the interference has been detected according to a level of strength of a signal obtained by the first access point in the frequency channel at a period wherein no data is sent or received by the second access point.

In a seventh aspect, a system for detecting an interference is also disclosed. The system comprises a first access point and a second access point, wherein:
The second access point is configured to process a data traffic on a frequency channel;
The first access point is configured to:
detect the data traffic of the second access point on the frequency channel;
obtain a level of strength of a signal received in the frequency channel at a period wherein the data traffic is not detected;
send an information item to the second access point for indicating the interference has been detected in the frequency channel according to the obtained level.

In an eight aspect, a computer program for detecting an interference is also disclosed. The computer program comprises program code instructions executable by a processor for performing the method implemented in the first access point in any of its variant, or the method implemented in the second access point in any of its variant.

In a ninth aspect, a computer-readable storage medium storing computer-executable program instructions is also disclosed. The computer-readable storage medium comprises instructions of program code executable by at least one processor to perform the method implemented in the first access point in any of its variant, or the method implemented in the second access point in any of its variant.

While not explicitly described, the present embodiments may be employed in any combination or sub-combination. For example, the present principles are not limited to the described variants, and any arrangement of variants and embodiments can be used. Moreover the present principles are not limited to the described ZigBee or Bluetooth examples and any other type of interfering technology is compatible with the disclosed principles. The present principles are not further limited to the described unlicensed 2.4 GHz and/or 5 GHz bands and are applicable to any other licensed or unlicensed band. The present principles are not further limited to the described wireless technologies.

Besides, any characteristic, variant or embodiment described for a method is compatible with an access point device intended to process the disclosed method, with a computer program product comprising program code instructions and with a computer-readable storage medium storing program instructions.

6. DESCRIPTION OF EMBODIMENTS

Figure 1:
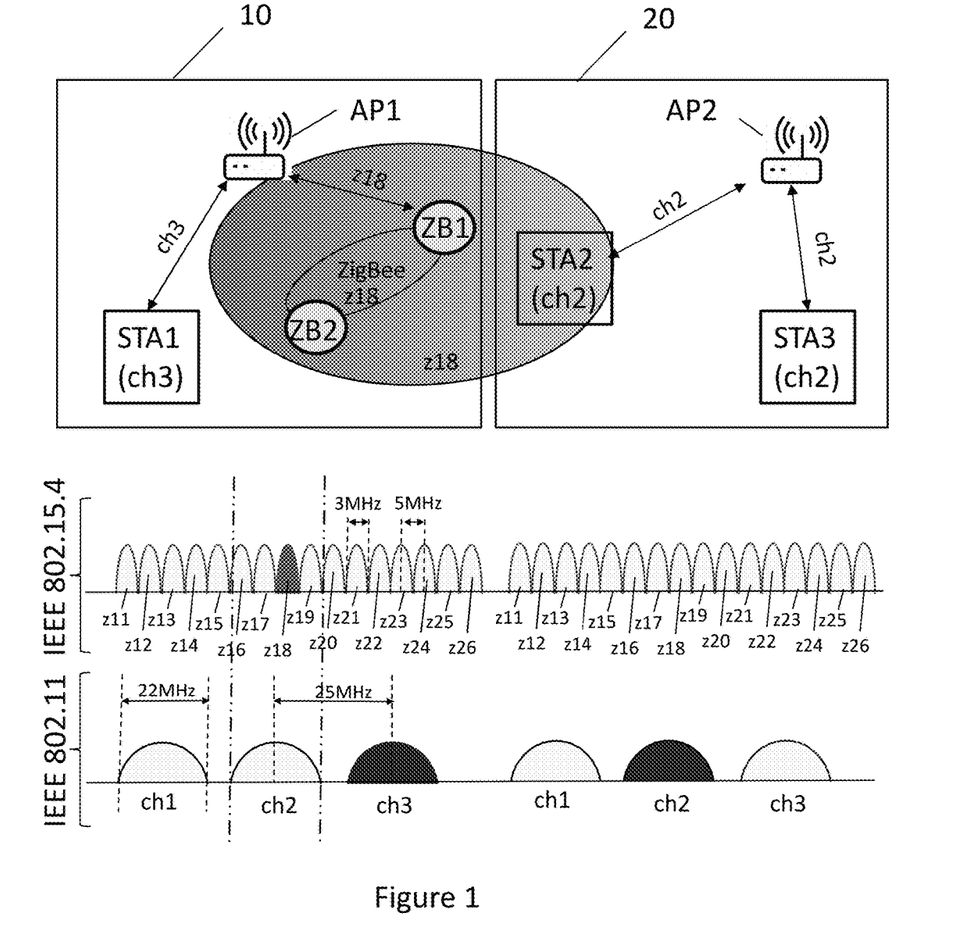
FIG. 1 depicts an example of a situation of occurring interferences according to a specific and non-limiting embodiment.

FIG. 1 illustrates an example of a situation of occurring interferences according to a specific and non-limiting embodiment of the disclosed principles. A first access point AP1 is installed in a first home 10 of a first user. The first access point AP1 comprises a wireless network interface operating in a radio frequency channel ch3. According to the specific and non-limiting embodiment of the disclosed principles, the first access point AP1 provides wireless networking functions towards wireless stations STA3 also operating in the radio frequency channel ch3. According to the specific and non-limiting embodiment of the disclosed principles, a second access point AP2 is installed in a second home 20 of a second user, the second home 20 being a neighbouring home of the first home 10. The second wireless access point AP2 also comprises a wireless network interface, operating in another radio frequency channel ch2 for providing wireless networking functions towards other wireless stations STA2, STA3 also operating in the other radio frequency channel ch2. According to the illustrated example, by operating on two different radio frequency channels ch2, ch3 the first and the second access points AP1, AP2 although being neighbouring access points do not interfere between each other.

For the sake of clarity and without loss of generality, the wireless network provided by the first and the second access points AP1, AP2 is referred throughout the description as a Wi-Fi network operating in the 2.4 GHz unlicensed band, according to any IEEE 802.11 variant, but any other kind of wireless network operating in any other band is also applicable to the disclosed principles.

Throughout the document, level of strength is described as being measured by RF front ends.

For the sake of clarity and without loss of generality, the first and second access points are described as having local RF front ends for measuring a level of signal strength. This is also applicable to access points with non local RF front ends such as for example virtualized access points where a RF front end is located a few kilometres away from a radio equipment controller (performing the baseband processing of the access point). radio equipment controller is connected to a RF front end via an optical fibre According to a specific and non-limiting embodiment of the disclosed principles, the first access point AP1 further comprises another optional wireless interface, also operating in the 2.4 GHz band. This other optional wireless interface is for example a ZigBee interface according to the IEEE 802.15.4 standard for wirelessly connecting for example a ZigBee controller ZB1 to the first access point AP1. The ZigBee controller ZB1 is further wirelessly connected to another ZigBee device ZB2, for example a ZigBee sensor using an IEEE 802.15.4 ultra-low power protocol. In a variant, the ZigBee devices ZB1, ZB2 constitute an autonomous wireless network independent from the first AP1 or second access point AP2. This is the case for example when the first access point AP1 does not include a wireless interface compatible with ZigBee. Any other kind of wireless interface also operating in the 2.4 GHz band such as for example Bluetooth for wirelessly connecting further peripherals to the first access point AP1, or among themselves independently from the first access point AP1 is also compatible with the disclosed principles.

The 2.4 GHz unlicensed band is further illustrated in FIG. 1 from an IEEE 802.11 perspective as a set of three consecutive frequency channels ch1, ch2, ch3. Each frequency channel ch1, ch2, ch3 has a width of 22 MHz, and a 25 MHz distance separates the centres of two consecutive IEEE 802.11 frequency channels. FIG. 1 further illustrates the 2.4 GHz unlicensed band from an IEEE 802.15.4 perspective as a set of sixteen consecutive frequency channels z11, z12, z13, z14, z15, z16, z17, z18, z19, z20, z21, z22, z23, z34, z25, z26, overlapping the three IEEE 802.11 frequency channels ch1, ch2, ch3. Each frequency channel z11-z26 has a width of 3 MHz, and a 5 MHz distance separates the centres of two consecutive IEEE 802.15.4 frequency channels. FIG. 1 further illustrates how IEEE 802.11 frequency channels overlap with IEEE802.15.4 frequency channels by vertically representing overlapping channels of both protocols. For example the IEEE 802.11 second frequency channel ch2 overlaps the four IEEE 802.15.4 consecutive frequency channels z16, z17, z18, z19. Moreover the frequency band is represented twice, the left side corresponding to the frequency band usage as perceived by the first access point AP1, the right side corresponding to the frequency band usage as perceived by the second access point AP2.

As previously described, some interfering wireless technologies such as ZigBee or Bluetooth have a pretty limited range. In the example illustrated in FIG. 1, the ZigBee controller ZB1 and/or the ZigBee sensor ZB2 interfere with the wireless station STA2, although they are not in the range of the second access point AP2. The ZigBee devices ZB1, ZB2 use the ZigBee frequency channel z18 which overlaps with the Wi-Fi frequency channel ch2 used by the wireless stations STA2. As the ZigBee devices are installed in the home 10, they are configured so as to use a ZigBee channel z18 not interfering with the frequency channel ch3 of the first access point AP1 of the home 10. This may be done either automatically, by the ZigBee devices ZB1, ZB2 detecting an amount of energy on the frequency channel ch3, or more manually by a user selecting not overlapping frequencies for both Wi-Fi and ZigBee wireless networks of the home 10. The second access point in the neighbouring home 20, being located sufficiently far from the ZigBee devices ZB1, ZB2 for detecting them, has no way to detect that the frequency channel ch2 is polluted by remote devices ZB1, ZB2 using the channel z18 interfering with one of its associated station STA2.

Figure 2A:
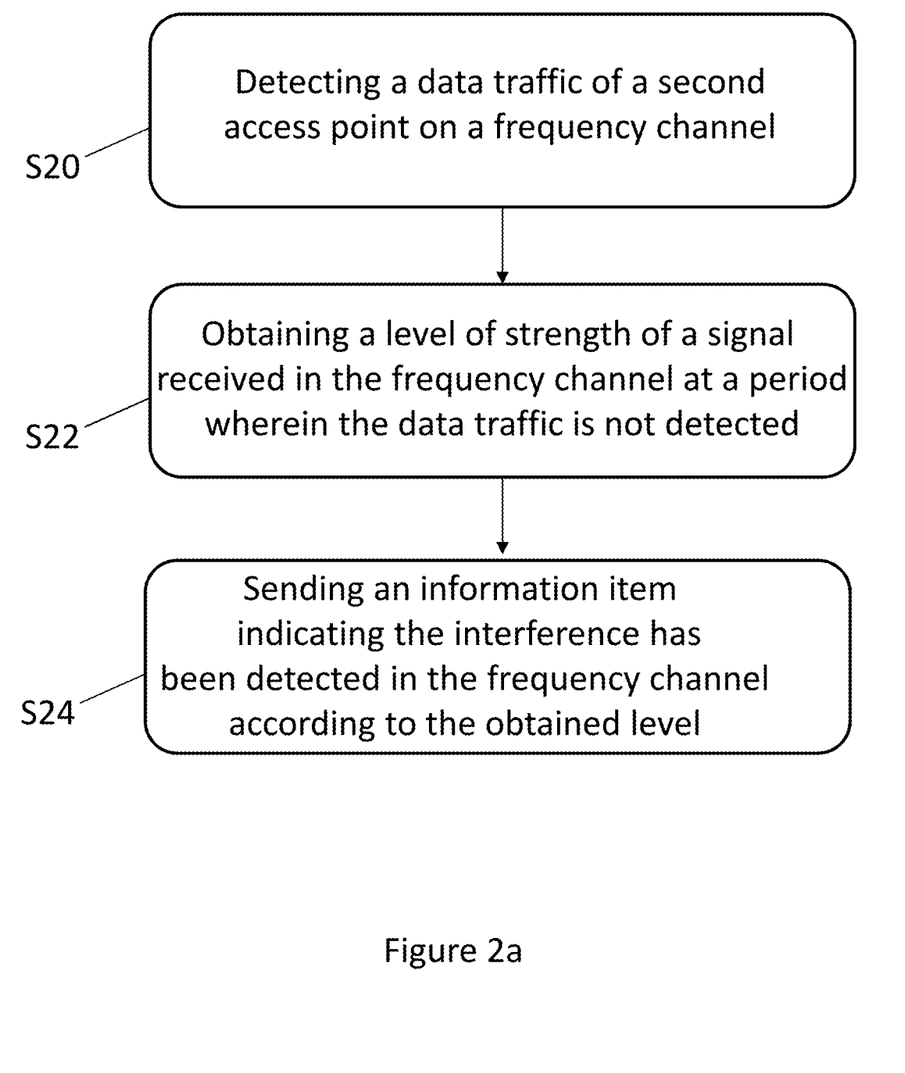
FIG. 2a illustrates a method for detecting an interference according to a specific and non-limiting embodiment.

FIG. 2a illustrates a method for detecting an interference according to a specific and non-limiting embodiment of the disclosed principles. According to the specific and non-limiting embodiment of the disclosed principles, the method is performed in a first wireless access point AP1 comprising a wireless network interface operating in a radio frequency channel ch3.

Detecting a Data Traffic of the Second Access Point AP2

In the step S20, the first access point AP1, operating a first wireless network in a first frequency channel ch3 is detecting a data traffic of a second access point AP2 in a second frequency channel ch2. For example, the wireless network interface of the first access point AP1 comprises several RF (radio frequency) front ends capable to operate in several frequency channels in parallel, over a same period of time. More precisely, each RF front end operates in a given, possibly different frequency channel, allowing the first access point to operate the first wireless network on the first frequency channel ch3 with a front end, and to scan other frequency channels ch1, ch2 for detecting traffic or measuring a received signal strength with another RF front end. In a second example the wireless network interface of the first access point comprises a single RF frond capable of time switching. More precisely, the RF front end is capable to sequentially switch and use different frequency channels ch1, ch2, ch3. In other words, the RF front end operates a first wireless network on the first frequency channel ch3 for a period of time, then switches to a second frequency channel ch2 for detecting traffic or measuring a received signal strength, over another period of time, etc. . . . .

Without loss of generality, the data traffic of the second access point AP2 is defined as comprising any data or control packet received and/or transmitted by the second access point AP2. For example, the data traffic of the second access point AP2 comprises any packet transmitted by the second access point AP2 to a station STA2, STA3. The data traffic of the second access point AP2 further comprises any unicast, multicast or broadcast packet transmitted by the second access point AP2. The data traffic of the second access point AP2 further comprises any packet sent by a station STA2, STA3 to the second access point AP2. Depending on the configurations, the first access point AP1 may not be itself in the range of the second access point AP2, and not capable of detecting packets sent by the second access point. The first access point AP1 may however detect packets transmitted by a station STA2 towards the second access point AP2. Such detected packets belong to the detected traffic of the second access point AP2, although the second access point AP2 may not be in the range of the first access point AP1.

Detecting the traffic of the second access point AP2 in the second frequency channel ch2 comprises configuring one of the RF front end of the first access point AP1 to the second frequency channel ch2 in any of the variant described above. In a first variant, detecting the traffic of the second access point AP2 further comprises configuring the wireless interface of the first access point AP1 in a snoop mode so as to capture all the data and control packets being transmitted by any wireless device in the range of the first access point AP1 over the second frequency channel ch2. The captured packets are further analysed so as to extract network identifiers identifying the network devices, being a station or an access point, and being a source or a destination of the captured packet. For the sake of clarity and without loss of generality the MAC (Medium Access Control) address is further used in the description for such network identifier, but any other kind of network identifier, being a network address or a logical connection identifier is compatible with the disclosed principles. The captured packets are for example classified according to the network devices having sent and/or received them. The detected data traffic of the second access point AP2 comprises the captured packets having been sent or received by the second access point AP2, wherein the MAC address of the second access point AP2 is either in the source MAC address or the destination MAC address field of the captured packets. The detected data traffic of the second access point AP2 further comprises the various beacons generated in broadcast mode by the second access point AP2. The BSSID (Basic Service Set Identifier) of the second access point AP2, identifying the second access point AP2 among other access points is further advantageously used in addition to the MAC address of the second access AP2 point to associate captured packets to the traffic of the second access point AP2.

In a second variant, detecting the traffic of the second access point AP2 comprises configuring the wireless interface to capture data packets according to a set of forwarding rules, so as to for example reduce the load of captured packets on the first access point AP1. Various techniques are available to the skilled in the art for configuring a network interface to capture packet flows according to forwarding rules, for example based on iptables or OpenFlow open software. The forwarding rules are for example determined so as to capture the data according to transmission mode (unicast/broadcast), or according to source and/or destination MAC addresses. In a first example the MAC address and/or the BSSID of the second access point AP2 is pre-configured in the first access point AP1. In a second example, the MAC address and/or the BSSID of the second access point AP2 is autonomously determined by the first access point, having run a preliminary acquisition of data traffic in a snoop mode for detecting devices in the neighbourhood. In a third example, the MAC address and/or the BSSID of the second access AP2 point is configured on the first access point AP1 by a network management system managing for example a set of access points, including the first and the second access points AP1, AP2.

In an advantageous variant, the first access point AP1 is detecting a plurality of data traffic of a plurality of access points, each access point operating in the second frequency channel or in another frequency channel.

Measuring a Level of Strength of a Received Signal

In the step S22, a level of strength of a signal is measured by the first access point AP1 wherein the signal is received in the frequency channel ch2 at a period of time wherein the data traffic of the second access point is not detected. For the sake of clarity and without loss of generality, the disclosed principles are described with access points measuring a level of signal strength with local embedded RF front ends, although they are equally applicable to access points obtaining a level of signal strength possibly measured by an external and even possibly remote RF front end. The disclosed principles are for example also applicable to virtualized access points where a RF front end (generally called radio equipment) is located a few kilometres away from a radio equipment controller (performing the baseband processing of the access point), both being interconnected by an optical fibre carrying a baseband radio signal. Throughout the description, the term "measured" or "measuring" is not restricted to locally measuring in a single device, but means possibly obtaining from another measuring device as for instance an external RF front end.

The first access point AP1 for example associates a time reference to any detected amount of energy, the time reference representing a time value when the energy is detected or the corresponding signal is received. Some detected amounts of energy further correspond to some data traffic of the second access point AP2 (in any of the variants described above), some other detected amounts of energy do not correspond to any data traffic of the second access point AP2. Detecting an amount of energy in the frequency channel ch2 that does not correspond to any data traffic of the second access point AP2 is done for example by analyzing the time reference of each detected amount of energy, and with which access point or device they correspond. They may correspond to Wi-Fi traffic received by or directed to other access points; they may also correspond to radio frequency activity of any other device. In other words, a received signal, corresponds to possible interferences for the second access point AP2, when it is measured in the same frequency channel ch2 as the operating frequency of the second access point AP1, without being transmitted by or directed to the second access point AP2.

Trimmer Sending an Information Item Indicating an Interference Detection

In the step S24, the first access point AP1 sends an information item indicating the interference has been detected in the second frequency channel ch2 according to the measured level.

In a first variant, the first access point AP1 triggers the transmission of the information item, in case the measured level is above a given power value. In a first example the given power value corresponds to a ratio, for example a third of the maximum allowed power in the frequency band. In a second example the given power value corresponds to 20 dB above the minimum receiver sensitivity of the physical layer of the receiver. Any other definition of a given power value is compatible with the disclosed principles.

In a second variant, the first access point AP1 triggers the transmission of the information item, in case the measured level is above a given power value during a period of time of a minimum duration.

In a third variant, the first access point AP1 triggers the transmission of the information item, in case the measured level is above a given power value for a minimum fraction of a period of time. The first, second and third variants are only exemplary techniques that can be further combined for thresholding an amount of detected energy for triggering the transmission of the information item indicating interferences have been detected in the second frequency channel ch2.

Transmitting the Information Item

Several variants are described below for the transmission of the information item by the first access point AP1. According to a first variant the first and second access points AP1, AP2 are connected to a same distribution system, for instance an Ethernet network, and the information item is transmitted by the first access point AP1 on the distribution system. According to another variant, the first access point AP1 sends the information item through a wireless network interface in the second frequency channel ch2. According to yet another variant, the information item is sent in broadcast mode, either wirelessly in the second frequency channel ch2, or using the previously described distribution system. According to yet another variant, the information item is sent in unicast mode by the first access point AP1, using the MAC address of the second access point AP2 as a destination MAC address for transmission of the information item, either wirelessly in the second frequency channel ch2, or using the previously described distribution system. According to yet another variant, the first access point AP1 is configured and managed by a network manager, using a remote management protocol, and the information item is transmitted to the network manager via the remote management protocol. According to this variant, the network manager will then communicate back with the second access AP2 point for mitigating the detected interferences Indicating the Detected Interferences Several options are described below as possible variants for the content of the information item. In a first variant the information item comprises an interference value quantifying the detected interferences. For example the interference value represents a fraction of a period of time (expressed in percentage) for which a level of signal, measured at step S22, is evaluated above the given power value. In another example the level of signal measured at step S22 is compared with a plurality of given power values and the interference value represents a plurality of fractions of a period wherein each fraction corresponds to the signal measured at step S22, evaluated in a range of given power values. In a second variant, the information item further comprises an indication of the type of the protocol having created the interference. The indication for example indicates whether the interfering protocol is ZigBee, Bluetooth, or unknown. The detection of the type of protocol is for example done by the first access point AP1, by detecting the interfering protocol from a compatible wireless interface.

Using a Clear Channel Assessment (CCA)

According to a specific and non-limiting embodiment of the disclosed principles, measuring the level of strength of the signal comprises performing a clear channel assessment (CCA) of the second frequency channel ch2. CCA is defined in the IEEE 802.11-2007 standards as part of the physical layer. CCA involves two related functions: CCA-CS (Clear Channel Assessment-Carrier Sense) and CCA-ED (Clear Channel Assessment-Energy Detection). CCA-CS comprises detecting and decoding Wi-Fi preambles, and from the physical layer convergence protocol header, inferring the time duration (in µs) for which the medium will be occupied. CCA-ED comprises detecting non-Wi-Fi energy in the frequency channel and back off data transmission. The ED threshold is for example defined to be 20 dB above the minimum receiver sensitivity of the physical layer of the receiver. According to this specific and non-limiting embodiment the measured level of strength of the signal received at a period wherein the data traffic of the second access point AP2 is not detected, comprises non-Wi-Fi energy as detected by CCA-ED, and Wi-Fi energy as detected by CCA-CS excluding the detected traffic of the second access point AP2.

In case CCA is used, any of the previously described variant for triggering the transmission of the information item, based on the measured level of strength and measured duration of the signal is applicable to the disclosed principles. Furthermore any of the previously described information item content variant based on the measured level of strength and measured duration of the signal is applicable to the disclosed principles using CCA.

Figure 2B:
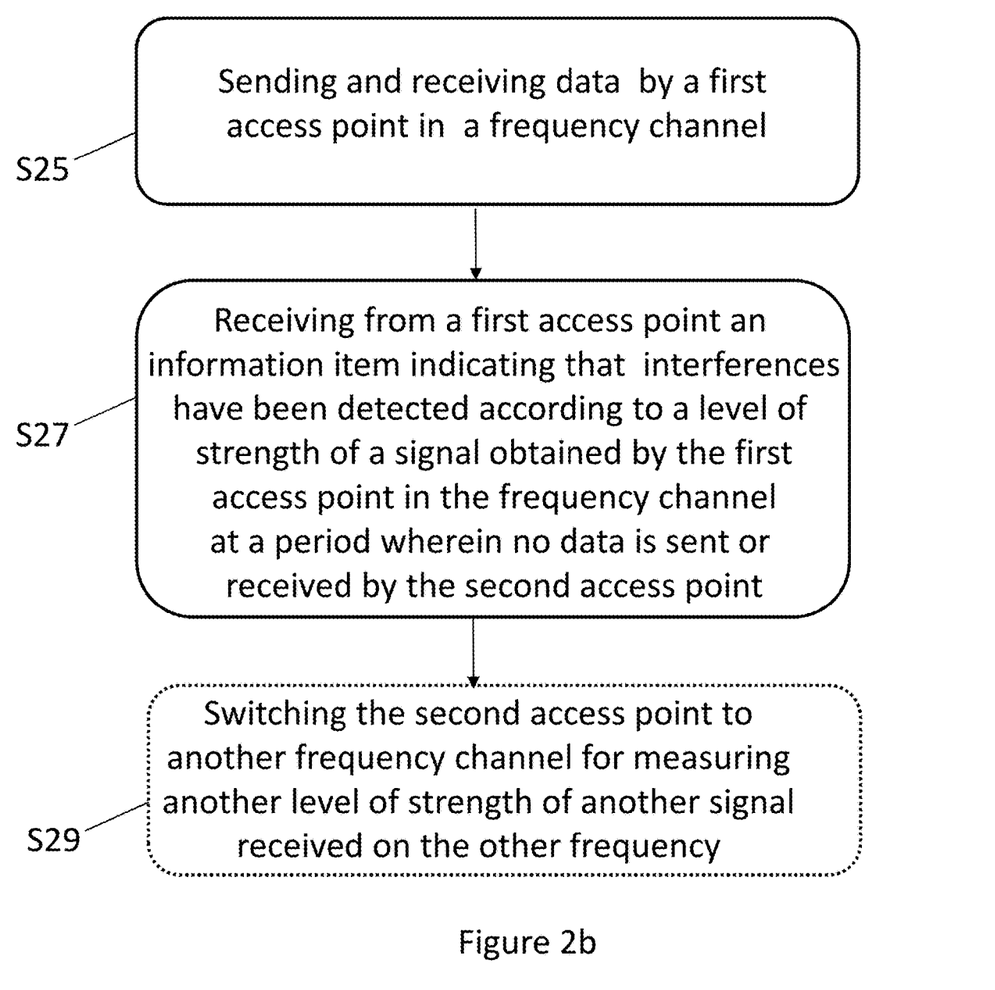
FIG. 2b illustrates the method for detecting an interference according to another specific and non-limiting embodiment.

FIG. 2b illustrates the method for detecting an interference according to another specific and non-limiting embodiment of the disclosed principles. According to the specific and non-limiting embodiment of the disclosed principles, the method is performed in a second wireless access point AP2 comprising a wireless interface operating a wireless network in a second frequency channel ch2.

In the step S25, the second access point AP2 transmits and receives packets in the second frequency channels ch2. Transmission comprises broadcast, multicast and unicast data transmission in the second frequency channel ch2.

In the step S27, the second access point AP2 receives from a first access point AP1 an information item according to any variant previously described. The information item indicates an interference has been detected according to a level of strength of a signal measured by the first access point AP1 in the second frequency channel ch2 at a period of time wherein no data has been sent or received by the second access point AP2. As mentioned previously, receiving such an indication that interferences have been detected in the same frequency channel by a first access point AP1 at points in time where there was no packet sent or received by the second access point AP2, is advantageous as it allows the second access point AP2 to know about interferences it does not directly measure, but that can disturb some of its associated wireless devices STA2. Once such indication is received, the second access point AP2 has a large set of possible actions for improving the situation. In a first example, being an optional step S29, the second access point AP2 switches to another frequency channel for measuring another level of strength of another signal received on the other frequency channel, so as to determine whether the other frequency channel provides better RF conditions than the currently used second frequency channel ch2. In another example, the second access point AP2 increases the transmit power towards its associated stations. In yet another example the second access point AP2 displays an information via a user interface, indicating interferences have been detected, and proposing users to move the second access point for improving the RF conditions. In yet another example, the second access point AP2 is capable of multiple beam forming and changes the beam configurations, looking forward improving the RF conditions. Any method for modifying the wireless interface configuration so as to improve the RF conditions is compatible with the disclosed principles.

According to yet another embodiment of the disclosed principles, a system is disclosed. The system comprises a first and a second access points AP1, AP2. The first access point AP1 sends and receives data in a first frequency channel ch3. The second access point AP2 sends and receives data in a second frequency channel ch2. The first access point AP1 detects a data traffic of the second access point AP2 on the second frequency channel ch2. The first access point AP1 further measures a level of strength of a signal received in the second frequency channel ch2 at a period of time wherein the data traffic of the second access point AP2 is not detected by the first access point AP1. The first access point AP1 detects some energy in the second frequency channel ch2, which is not corresponding to any data traffic of the second access point AP2. There is a possibility that the detected energy is interfering with some of the stations of the second access point AP2. It is further possible that the second access point AP2 does not detect that energy due to different ranges and locations. It is therefore advantageous that the first access point AP1 sends an information item indicating an amount of energy has been detected in the second frequency channel ch2 at periods of time not corresponding to any data traffic of the second access point AP2. The second access point AP2, for example experiencing some transmission errors with one of its station, despite a reasonable level of signal to noise ratio, and receiving the information item sent by the first access point AP1, is in a position to correlate the transmission errors with a possible remote interfering device, not being in its own range. The second access point AP2, being aware of remote interferences in the second frequency channel ch2 possibly impacting some of its associated wireless device may further take any appropriate action for improving the networking conditions.

The disclosed principles are advantageous in many situations. A first example is an internet service provider supplying access points to customers according to the disclosed principles. In dense urban areas, the internet service provider, by remotely managing and configuring its access points has the capacity to detect interferences by a first access point, wherein the interferences disturb some devices associated with a second access point, despite of not being directly detectable by the second access point. The Internet service provider advantageously adapts the configuration of the second access point so as to better mitigate the interferences experienced by some of its associated devices.

In a second example, a device manufacturer may advantageously implement the disclosed principles in its access points, so that its access points will better cooperate and better work together in a closed neighbourhood than a heterogeneous set of access points provided by different manufacturers, not implementing the disclosed principles.

Figure 3:
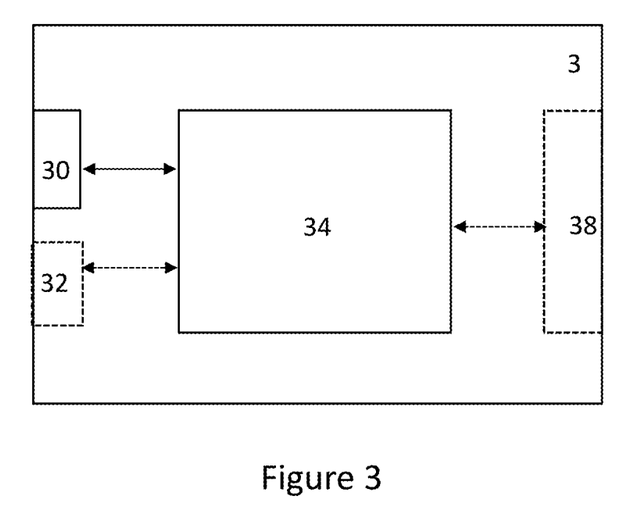
FIG. 3 represents a processing device for detecting an interference according to two specific and non-limiting embodiments.

FIG. 3 depicts a processing device for detecting an interference, according to two specific and non-limiting embodiments of the disclosed principles. The processing device 3 comprises a first network interface 30 configured to send and receive packets to/from at least one wireless devices. According to different embodiments of the disclosed principles, the first network interface 30 is a wireless network interface belonging to a set comprising:
  IEEE 802.11 comprising any variation of the IEEE 802.11 standard;
  Bluetooth in any of its variant.

The processing device 3 further comprises an optional second interface 32 configured to send and receive packets to/from at least one other wireless device. According to different embodiments of the disclosed principles, the second network interface 32 is a wireless network interface belonging to a set comprising:
  IEEE 802.15.3 in any of its variant, especially supporting ZigBee devices
  Bluetooth in any of its variant.
More generally any wireless network interface allowing to send and receive packets to/from a wireless device is compatible with the disclosed principles.

According to a specific and non-limiting embodiment, the processing device 3 further comprises an optional third network interface 38 configured to send and receive packets towards other devices. According to different embodiments of the disclosed principles, the third network interface 38 belongs to a set comprising:
  A wired local area network interface such as for example Ethernet, MoCA or a power line interface;
  A bus interface as for example USB in any of its variant;
  A broadband network interface, comprising a wide area network interface such as xDSL, HFC, FTTx, WiMAX
  A wireless network interface in any of the variant mentioned above.

The processing device 3 may for example comprise two third network interfaces 38, one being a wired LAN interface and one being a WAN interface, such as home gateways providing internet access at home. More generally any network interface allowing to send and receive packets towards other devices, is compatible with the disclosed principles. The first, second and third interfaces 30, 32, 38 are linked to a processing module 34, being configured to detect an interference.

According to a first and non-limiting embodiment of the disclosed principles, the first network interface 30 is configured to capture data packets in a radio frequency channel. The processing module 34 is configured to detect a data traffic of an access point from the data packets captured by the first network interface 30. The processing module 34 is further instructed to configure the first network interface 30 for measuring a level of strength of a signal received in the frequency channel at a period of time wherein the data traffic is not detected. The processing module 34 is further configured to send an information item indicating the interference has been detected in the frequency channel according to the measured level. According to different variants, the information item is sent on any of the first 30, second 32 or third 38 network interface. This first embodiment of the processing device 3 corresponds to the first access point AP1 of the method described at FIG. 2a.

According to a second and non-limiting embodiment of the disclosed principles, the first network interface 30 is configured to transmit and receive packets of a radio frequency channel. The processing module 34 is configured to process an information item indicating that the interference has been detected according to a level of strength of a signal measured by an access point in the frequency channel at a period wherein no data is sent or received by the processing device 3. According to different variants, the information item is received from any of the first 30, second 32 or third 38 network interface. This second embodiment of the processing device 3 corresponds the second access point AP2 of the method described at FIG. 2b.

Figure 4:
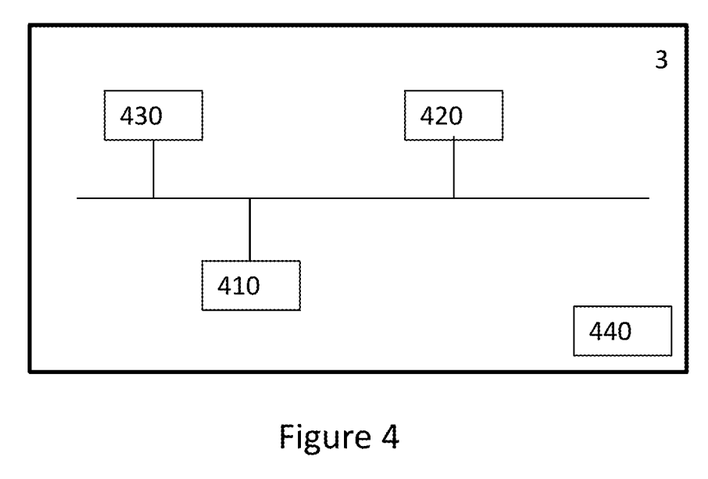
FIG. 4 represents an exemplary architecture of the processing device of FIG. 3 according to a specific and non-limiting embodiment.

FIG. 4 represents an exemplary architecture of the processing device 3 according to a specific and non-limiting embodiment, where the processing device 3 is configured to detect an interference. The processing device 3 comprises one or more processor(s) 410, which is(are), for example, a CPU, a GPU and/or a DSP (English acronym of Digital Signal Processor), along with internal memory 420 (e.g. RAM, ROM, EPROM). The processing device 3 comprises one or several Input/Output interface(s) 430 adapted to send to display output information and/or to allow a user to enter commands and/or data (e.g. a keyboard, a mouse, a touchpad, a webcam, a display), and/or to send/receive data over a network interface; and a power source 440 which may be external to the processing device 3.

According to an exemplary and non-limiting embodiment, the processing device 3 further comprises a computer program stored in the memory 420. The computer program comprises instructions which, when executed by the processing device 3, in particular by the processor 410, make the processing device 3 carry out the processing method described with reference to FIG. 2a or 2b. According to a variant, the computer program is stored externally to the processing device 3 on a non-transitory digital data support, e.g. on an external storage medium such as a SD Card, HDD, CD-ROM, DVD, a read-only and/or DVD drive and/or a DVD Read/Write drive, all known in the art. The processing device 3 thus comprises an interface to read the computer program. Further, the processing device 3 could access one or more Universal Serial Bus (USB)-type storage devices (e.g., "memory sticks.") through corresponding USB ports (not shown).

According to exemplary and non-limiting embodiments, the processing device 3 is a device, which belongs to a set comprising:
an access point device;
an Internet gateway device;
a set top box device;
a smartphone;
a digital media player device;
a TV device;
a mobile device;
a game device;
a tablet (or tablet computer);
a laptop;
a communication device.

The invention claimed is:

1. A method in a first access point for detecting an interference, said method comprising:
   detecting a data traffic of a second access point on a frequency channel;
   obtaining a level of strength of a signal received in the frequency channel at a period wherein the data traffic is not detected;
   sending an information item indicating the interference has been detected in the frequency channel according to the obtained level.

2. The method according to claim 1, wherein sending the information item comprises transmitting the information item in the frequency channel.

3. The method according to claim 1, wherein sending the information item comprises broadcasting the information.

4. The method according to claim 1, wherein sending the information item comprises a unicast transmission of the information item to the second access point.

5. The method according to claim 1, wherein the first access point and the second access point are Wi-Fi access points.

6. The method according to claim 5, wherein obtaining the level of strength of the signal comprises performing a clear channel assessment of the frequency channel.

7. The method according to claim 5, wherein the first access point further comprises another wireless interface according to a protocol of type ZigBee or Bluetooth.

8. The method according to claim 7, wherein the information item further comprises an indication of the type of protocol having created the interference.

9. The method according to claim 1, wherein the information item further comprises a value quantifying the detected interference.

10. A method in a second access point for detecting an interference, said method comprising:
    sending and receiving data in a frequency channel,
    receiving from a first access point an information item indicating that the interference has been detected according to a level of strength of a signal obtained by the first access point in the frequency channel at a period wherein no data is sent or received by the second access point.

11. The method according to claim 10, further comprising switching the second access point to a second frequency channel for measuring another level of strength of another signal received on the second frequency channel.

12. A first access point comprising a processor configured to:
    detect a data traffic of a second access point on a frequency channel;
    obtain a level of strength of a signal received in the frequency channel at a period wherein the data traffic is not detected;
    send an information item indicating an interference has been detected in the frequency channel according to the obtained level.

13. The first access point according to claim 12, being a Wi-Fi access point.

14. The first access point according to claim 13, further comprising another wireless interface according to a protocol of type ZigBee or Bluetooth.

15. A second access point comprising a processor configured to:
    send and receive data in a frequency channel,
    receive from a first access point an information item indicating that an interference has been detected according to a level of strength of a signal obtained by the first access point in the frequency channel at a period wherein no data is sent or received by the second access point.

16. The second access point according to claim 15, wherein the processor is further configured to switch to a second frequency channel for measuring another level of strength of another signal received on the second frequency channel.

17. The second access point according to claim 15, being a WiFi access point.

18. A system for detecting an interference, the system comprising a first access point and a second access point, wherein:
    the second access point is configured to process a data traffic on a frequency channel;
    the first access point is configured to:
      detect the data traffic of the second access point on the frequency channel;
      obtain a level of strength of a signal received in the frequency channel at a period wherein the data traffic is not detected;
      send an information item to the second access point for indicating the interference has been detected in the frequency channel according to the obtained level.

19. A non-transitory computer-readable storage medium storing computer-executable program instructions, said computer-executable program instructions comprising program code instructions executable by a processor for performing the method according to claim 1.

20. A non-transitory computer-readable storage medium storing computer-executable program instructions, said computer-executable program instructions executable by a processor for performing the method according to claim 10.

* * * * *